US006675451B1

(12) United States Patent
Miyano

(10) Patent No.: US 6,675,451 B1
(45) Date of Patent: Jan. 13, 2004

(54) MACHINE TOOL AND METHOD OF USING THE MACHINE TOOL

(76) Inventor: Toshiharu Miyano, c/o Miyano Machinery USA, Inc., 940 Central Ave., WoodDale, IL (US) 60191

( * ) Notice: Subject to any disclaimer, the term of this patent is extended or adjusted under 35 U.S.C. 154(b) by 0 days.

(21) Appl. No.: 09/567,917

(22) Filed: May 10, 2000

(51) Int. Cl.[7] .............................................. B23B 7/00
(52) U.S. Cl. ...................... 29/27 C; 29/27 R; 82/1.11; 82/124; 82/127; 82/129
(58) Field of Search ............... 29/27 C, 27 R; 82/1.11, 129, 127, 124

(56) References Cited

U.S. PATENT DOCUMENTS

| | | | | |
|---|---|---|---|---|
| 4,457,193 A | * | 7/1984 | Matthey | 29/36 X |
| 4,557,166 A | * | 12/1985 | Jauch | 82/129 |
| 4,612,832 A | * | 9/1986 | Ushigoe et al. | 82/129 |
| 4,827,814 A | * | 5/1989 | Wilkins | 82/1.11 |
| 4,827,815 A | * | 5/1989 | Hata et al. | 82/124 X |
| 5,152,201 A | * | 10/1992 | Izawa | 82/1.11 |
| 5,343,604 A | * | 9/1994 | Takagi | 29/27 C |
| 5,421,229 A | * | 6/1995 | Grossmann et al. | 82/124 |
| 5,471,900 A | * | 12/1995 | Corwin et al. | 82/129 X |
| 5,490,307 A | * | 2/1996 | Link | 29/27 C |
| 5,514,061 A | * | 5/1996 | Ito | 483/18 |
| 5,655,423 A | * | 8/1997 | Nishio et al. | 82/172 |
| 5,787,560 A | * | 8/1998 | Schalles | 29/362 |
| 5,832,590 A | * | 11/1998 | Wuerthner | 82/129 |
| 5,842,393 A | * | 12/1998 | Nagel | 82/129 |

FOREIGN PATENT DOCUMENTS

| | | | | |
|---|---|---|---|---|
| DE | 3420531 | * | 12/1985 | 27/27 C |
| JP | 40 5050353 | * | 3/1992 | 29/27 C |
| JP | 4-122501 | * | 4/1992 | 29/27 C |

* cited by examiner

Primary Examiner—A. L. Wellington
Assistant Examiner—Doana Ross
(74) Attorney, Agent, or Firm—Wood, Phillips, Katz, Clark & Mortimer

(57) ABSTRACT

A method of processing a workpiece including the steps of: placing a first preform element in a first operative position on a first holder so that a first portion of the first preform element is exposed; performing a processing operation on the first portion of the first preform element with the first preform element in the first operative position; transferring the first preform element into a second operative position on a second holder; with the first preform element in the second operative position exposing a second portion of the first preform element that is not exposed for processing with the first preform element in the first operative position; and with the first preform element in the second operative position and the second portion of the first preform exposed, performing a processing operation on the second portion of the first preform element.

18 Claims, 12 Drawing Sheets

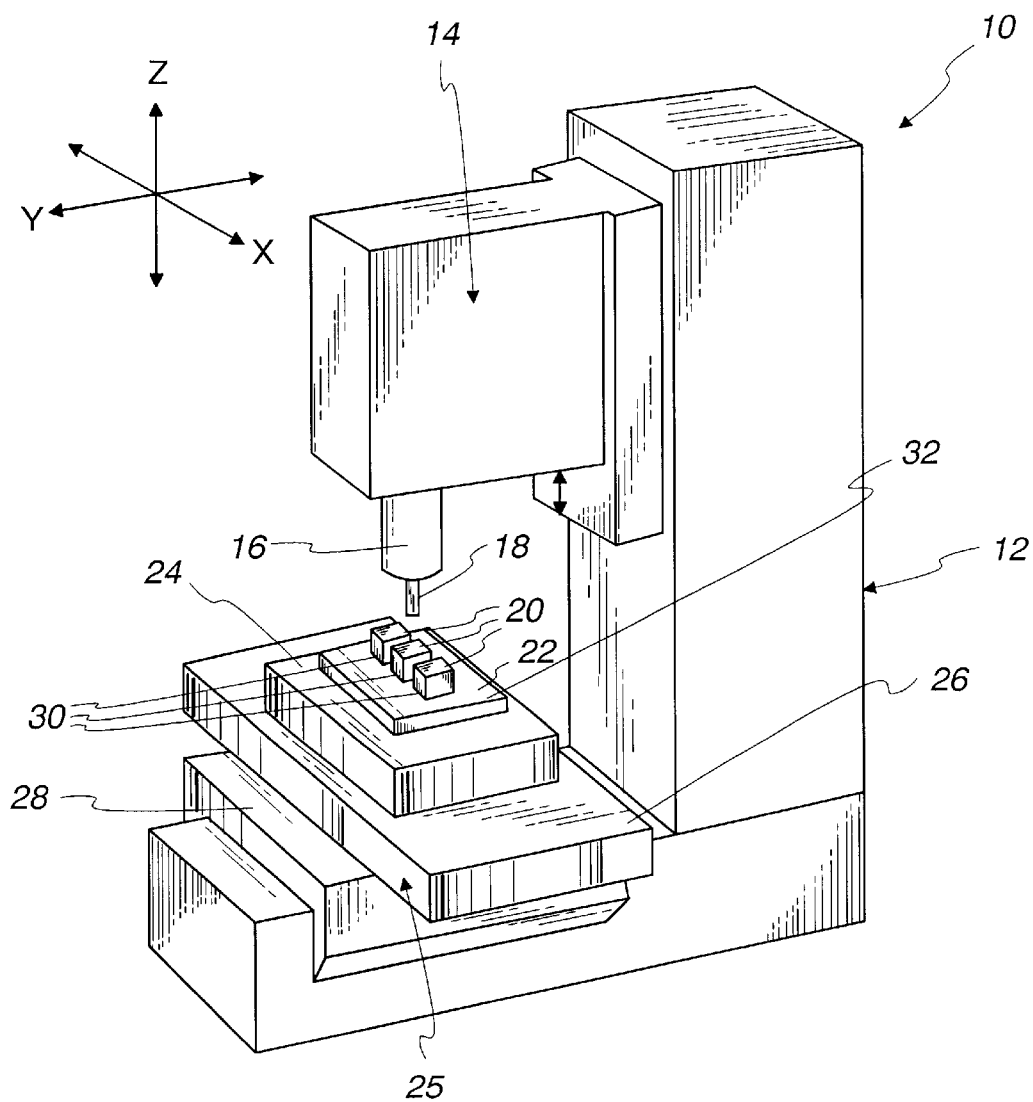
Fig. 1 - Prior Art

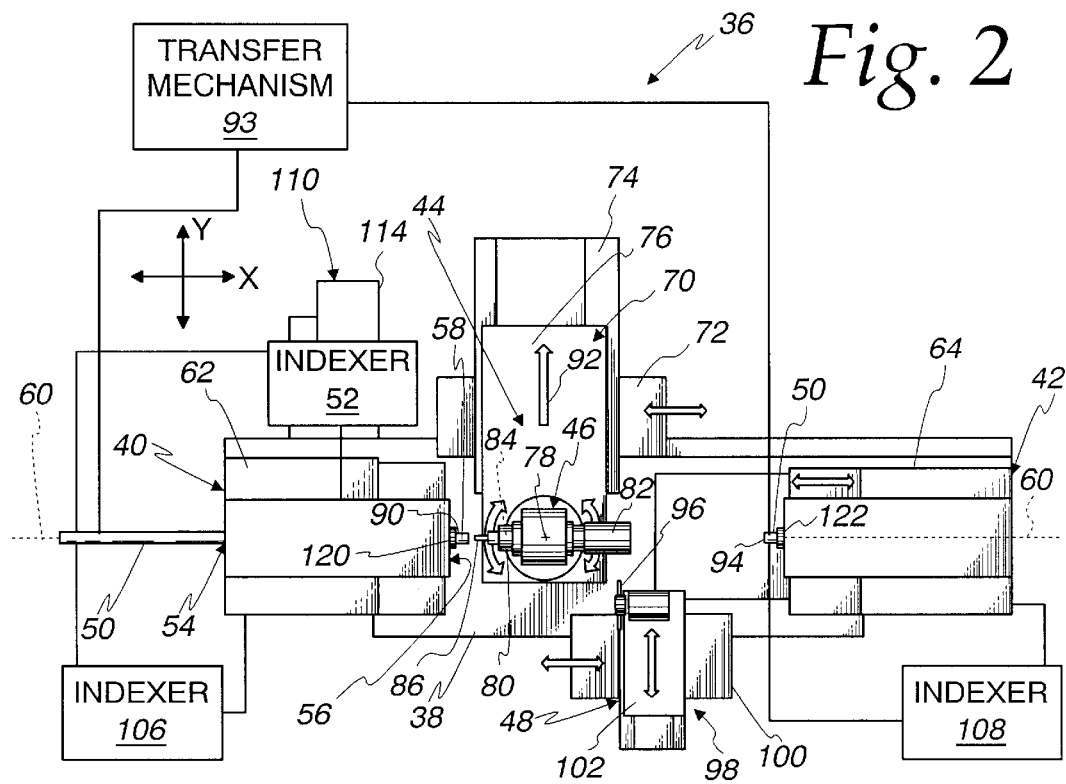
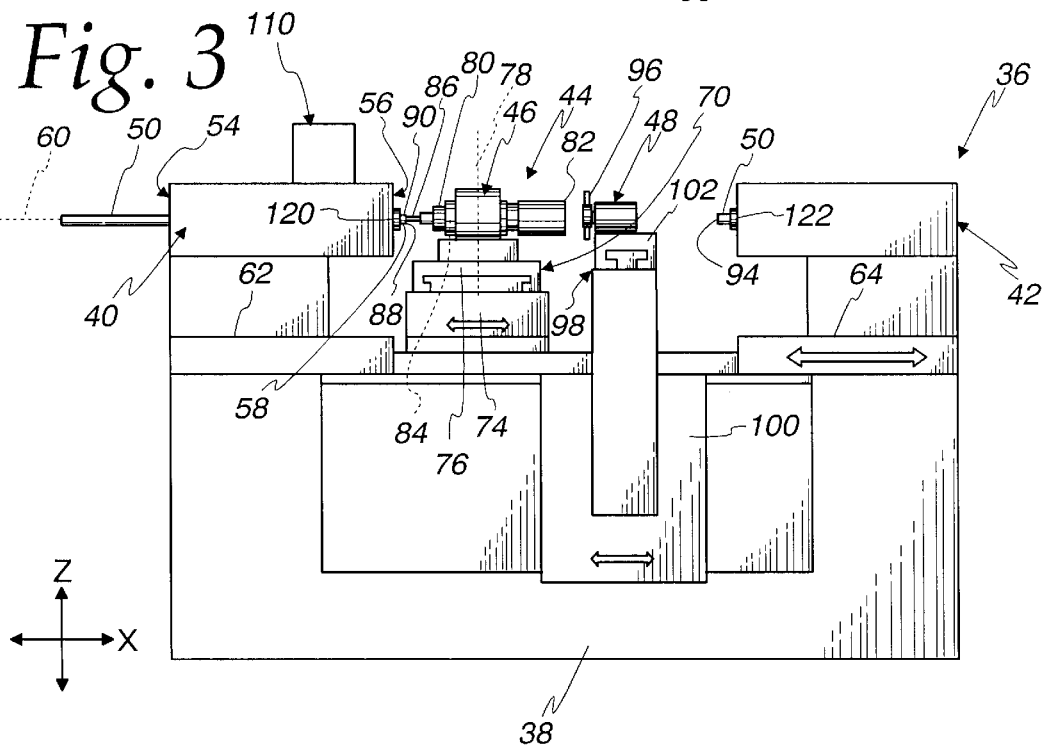

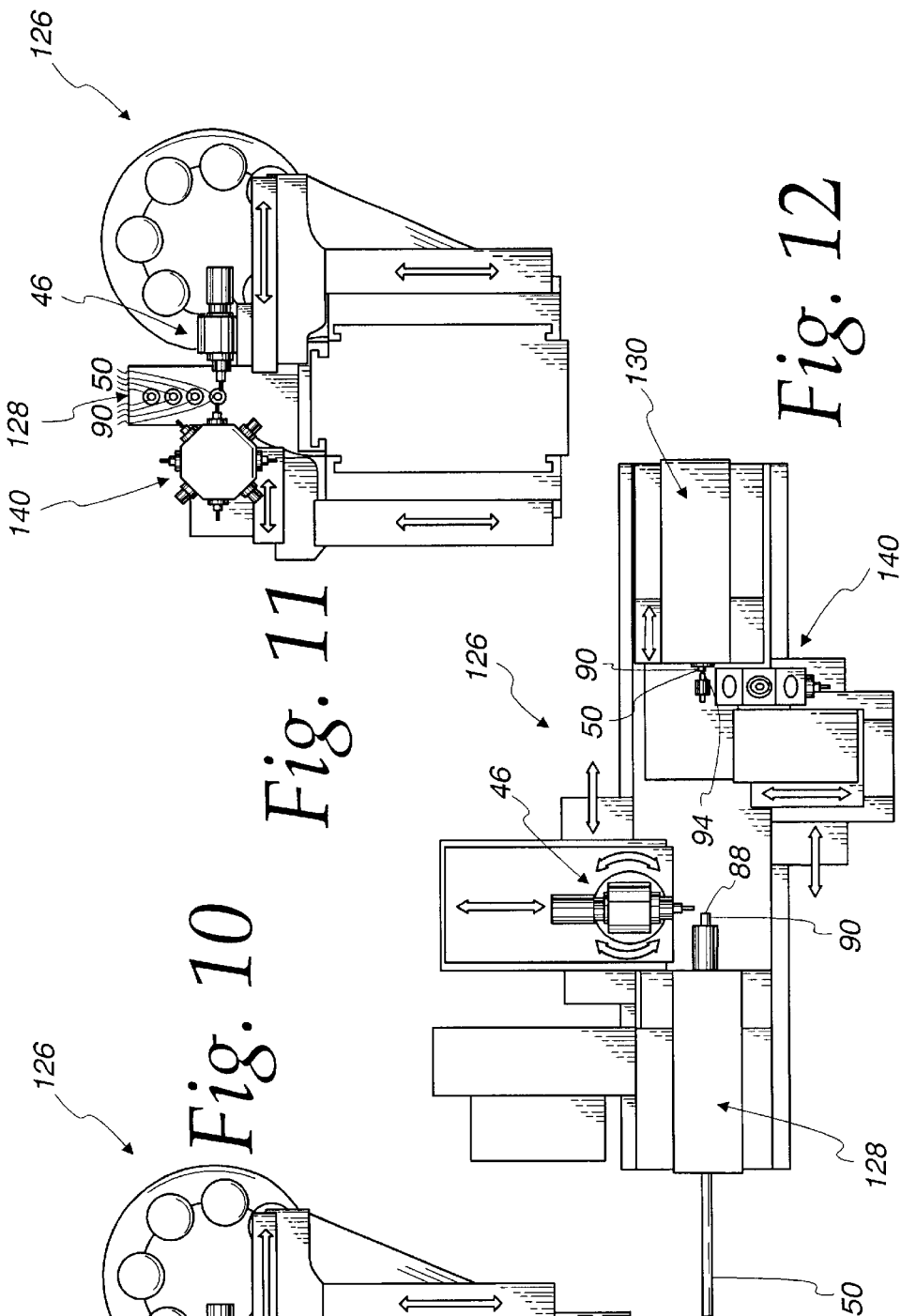

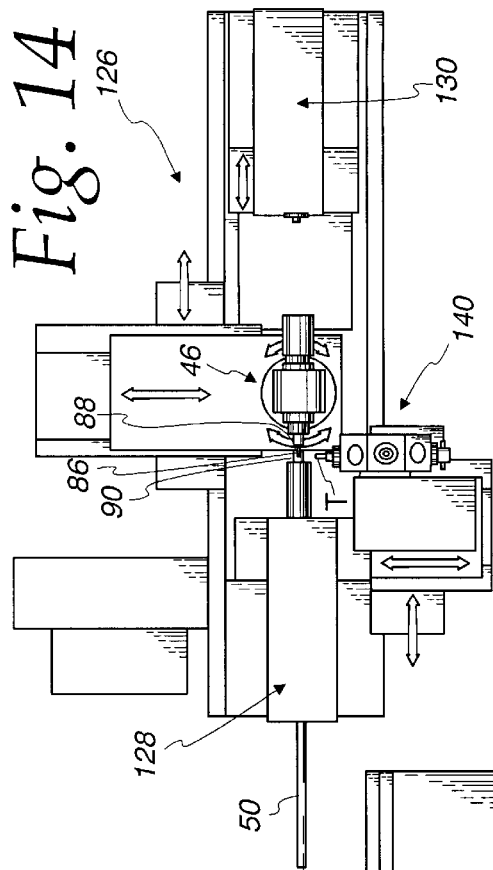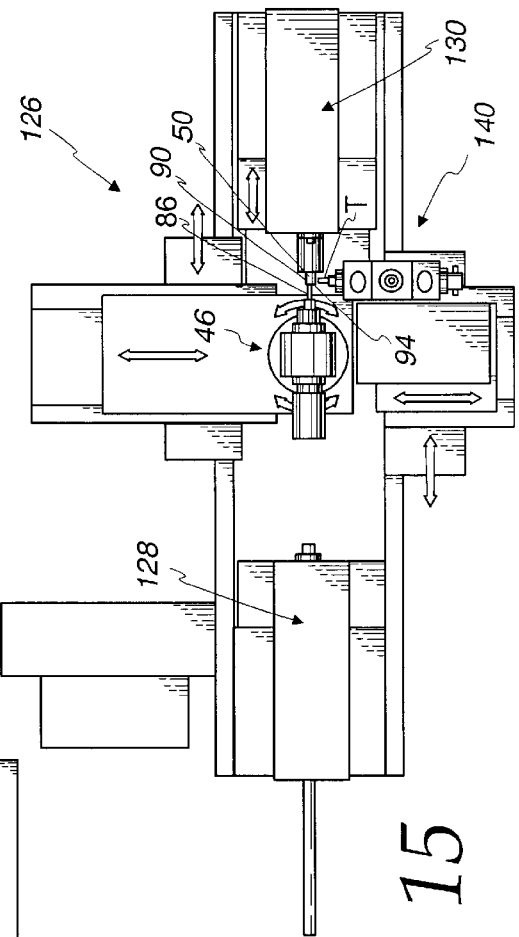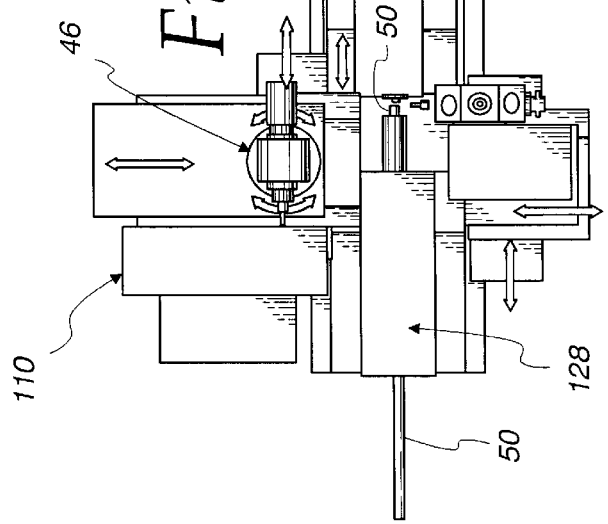

MACHINE TOOL AND METHOD OF USING
THE MACHINE TOOL

BACKGROUND OF THE INVENTION

1. Field of the Invention

This invention relates to machine tools for processing discrete workpieces and, more particularly, to a machine tool through which individual workpieces can be strategically situated to facilitate processing on various sides thereof. The invention is also directed to a method of using the machine tool.

2. Background Art

In machining operations, it may be necessary to process most or all of the sides of a workpiece. In one conventional machining process, a first surface of a workpiece preform, nominally matched and dimensioned to the desired end configuration, is placed on a support to facilitate processing of the remaining surfaces thereon. Once processing of the remaining surfaces is completed, the first surface is separated from the support and exposed to allow the desired processing step(s) to be performed thereon.

Typically, a three-axis machine tool is employed to carry out the initial stage processing. Provision must then be made to engage and separate the workpiece from the support to expose the first surface to allow processing thereof.

In FIG. 1 herein, a conventional prior art vertical machining center is shown at 10. The machining center 10 consists of a frame 12 on which a spindle head assembly 14 is mounted for guided vertical, Z-axis movement. The spindle head assembly 14 carries a rotary spindle 16 with a working tool 18 that processes discrete workpiece preforms 20, which are mounted in a predetermined relationship on a pallet 22.

The pallet 22 is in turn supported upon a table 24, which is carried upon a slide assembly 25 consisting of stacked slides 26, 28. The lower slide 28 is mounted for guided movement relative to the frame 12 along the Y-axis. The upper slide 26, to which the table 24 attaches, is mounted for guided movement relative to the lower slide 28 along the X-axis.

In a typical machining operation, the workpiece preforms 20 are placed on the pallet 22 so that a surface 30 on each of the workpiece preforms 20 bears upon a support surface 32 on the pallet 22. Through controlled movement of the slides 26, 28, the workpiece preforms 20 are moved in the X-Y plane. At the same time, the working tool 18 moves along the Z-axis, following movement of the spindle head assembly 14.

The workpiece preforms 20 are spaced from each other so that all but the supporting surfaces 30 are exposed to be processed by the working tool 18. After the processing operation is concluded on the exposed portions of the workpiece preforms 20, the workpiece preforms 20 are separated from the pallet 22 and reoriented, as by inversion, and placed against the palle surface 32 to expose the surfaces 30 so that an appropriate processing operation can be performed using the working tool 18, or another tool in its stead.

The resituation of the workpiece preforms 20, during processing thereof, may result in significant down time.

Further, it is common for the workpiece preforms 20 to be manually placed upon the pallet 22, and for the workpiece preforms 20, after processing, to be manually separated from the pallet 22. This may result in significant inconvenience and time consumption.

Alternatively, it is known to use relatively complex and expensive automated setup systems with changers for removing an inactive table 24/pallet 22 and substituting therefor a table 24/pallet 22 with unprocessed workpiece preforms 20 thereon. The table 24/pallet 22 exchange may take a significant amount of time. Also, a significant time investment may be involved by reason of the manual placement and removal of workpiece preforms 20 both prior to and after the performance of a machining operation.

SUMMARY OF THE INVENTION

The invention is directed to a method of processing a workpiece including the steps of: placing a first preform element in a first operative position on a first holder so that a first portion of the first preform element is exposed; performing a processing operation on the first portion of the first preform element with the first preform element in the first operative position; transferring the first preform element into a second operative position on a second holder; with the first preform element in the second operative position exposing a second portion of the first preform element that is not exposed for processing with the first preform element in the first operative position; and with the first preform element in the second operative position and the second portion of the first preform exposed, performing a processing operation on the second portion of the first preform element.

The second portion of the first preform element may be exposed by cutting the first preform element.

A single processing assembly may be used to perform the processing operations on both the first and second portions of the first preform element. Alternatively, a first processing assembly may be used to perform the processing operation on the first portion of the first preform element with a second processing assembly, operable independently of the first processing assembly, used to perform a processing operation on the second portion of the first preform element.

A second preform element can be placed in the first operative position on the first holder with the first preform element in the second operative position on the second holder.

A processing operation may be performed on the second preform element in the first operative position on the first holder with the first processing assembly while performing a processing operation on the first preform element in the second operative position on the second holder with the second processing assembly.

A second preform element can be provided on the first holder so that the first and second preform elements are simultaneously held by the first holder. After the step of performing a processing operation on the first portion of the first preform element by the first processing assembly, the first processing assembly and the second preform element may be relatively repositioned to allow the first processing assembly to perform a processing operation on the second preform element with the second preform element on the first holder.

The first processing assembly may have a first processing tool thereon. During the processing operation on the first portion of the first preform element, the processing tool may be moved along at least two orthogonal axes.

The second processing assembly may have a plurality of tools that are selectively indexed to an active position in which each of the plurality of tools in the active position performs a processing operation on the second portion of the first preform element.

The first preform element may be indexed on the first holder between a standby position and the first operative position.

The first preform element may be transferred directly from the first holder to the second holder.

The invention is also directed to a machine tool having a first holder, a second holder, and a processing system. The first holder maintains a first preform element in a first operative position wherein a first portion of the first preform element is exposed so that a machining operation can be performed on the first portion of the first preform element. The second holder maintains the first preform element in a second operative position wherein a second portion of the first preform element that is not exposed for processing with the first preform element in the first operative position is exposed for processing. The processing system has at least one processing assembly for performing a processing operation on the first portion of the first preform element in the first operative position and the second portion of the first preform element in the second operative position.

At least part of the at least one of the first and second holders may be movable guidingly relative to the other of the first and second holders to allow the first preform element to be transferred directly from the first holder to the second holder.

In one form, the at least one processing assembly is a first processing assembly that is repositionable relative to the first and second holders to allow the first processing assembly to perform a processing operation on the first preform element in the first operative position and a processing operation on the first preform element in the second operative position.

In one form, the first processing assembly has a first tool that is rotatable around a first axis for performing a processing operation and at least one part of the first processing assembly carrying the first tool is pivotable around a second axis that is transverse to the first axis to permit selective processing of the first preform element in the first and second operative positions for the first preform element.

The machine tool may be provided in combination with a first preform element.

The processing system may include a second processing assembly that is operable independently of the first processing assembly to perform a processing operation on the first preform element in the second operative position.

In one form, a cutting assembly, separate from the first and second processing assemblies, is provided for severing the first preform element on at least one of the first and second holders and thereby exposing the second portion of the first preform element.

The second processing assembly may include a turret with a plurality of tools that are selectively operable to perform a processing operation on the first preform element in the second operative position.

The first holder may be capable of holding a second preform element at the same time the first preform element is on the first holder.

The second holder may be capable of holding a second preform element at the same time the first preform element is on the second holder.

The first and second preform elements on the first holder may be selectively movable into the first operative position.

The first and second preform elements on the second holder may be selectively movable into the second operative position.

In one form, the at least part of the first processing assembly is movable guidingly along three orthogonal axes.

The turret may be translatable guidingly along two orthogonal axes.

The first processing assembly may include a tool receptacle, with the machine tool further having an automatic tool changer for selectively placing different tools in the tool receptacle.

A frame may be provided upon which the first and second holders and processing system are mounted.

BRIEF DESCRIPTION OF THE DRAWINGS

FIG. 1 is a perspective view of a conventional machine tool for performing processing operations on a plurality of discrete parts;

FIG. 2 is a plan view of a machine tool, according to the present invention, including first and second holders for stock material and a processing assembly for performing a processing operation on stock material held by each of the first and second holders;

FIG. 3 is a front elevation view of the machine tool of FIG. 2;

FIG. 10 is a side elevation view of the machine tool in FIGS. 8 and 9 with the first processing assembly situated to perform a processing operation on the uppermost piece of material stock on the first holder and the second processing assembly situated to perform a processing operation on the uppermost piece of stock material on the second holder, FIG. 11 is a view as in FIG. 10 with the processing assemblies situated to perform a processing operation on the lowermost pieces of stock material on the first and second holders;

FIG. 12 is a plan view of the machine tool in FIGS. 6–11 in the configuration of FIG. 11;

FIG. 13 is a plan view of the machine tool in FIGS. 6–12 with the processing assemblies resituated and the first and second holders relatively repositioned to allow direct transfer of a piece of stock material from one holder to the other;

FIG. 14 is a plan view of the machine tool in FIGS. 6–13 with the first and second processing assemblies situated to simultaneously perform processing operations on a piece of stock material on the first holder;

FIG. 15 is a view as in FIG. 14 with the processing assembly situated to simultaneously perform a processing operation on a piece of stock material on the second holder;

DETAILED DESCRIPTION OF THE DRAWINGS

Figure 4:
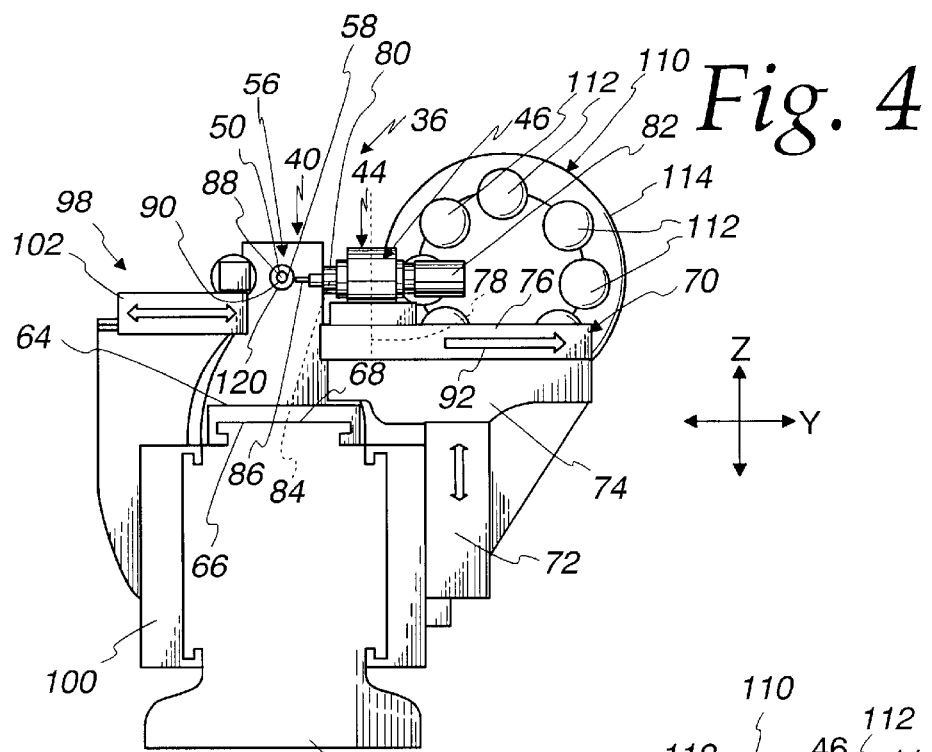
FIG. 4 is a side elevation view of the machine tool in FIGS. 2 and 3 with the second holder removed for clarity and with the processing assembly resituated from the position shown in FIGS. 2 and 3 and including a tool change mechanism for interchanging tools on the processing assembly.

One form of machine tool, according to the present invention, is shown in FIGS. 2–5 at 36. The machine tool 36 consists of a frame 38 upon which first and second holders 40, 42 are mounted. The frame 38 also supports a processing system 44, which in this case includes a single processing assembly 46. The frame 38 further supports a cutting assembly 48.

The holders 40, 42 have a similar construction. Exemplary holder 40 is designed to hold individual workpiece/preform elements, nominally dimensioned to the desired size of a completed workpiece, in a first operative position. Throughout, the workpiece/preform element is shown as an elongate piece of bar stock 50. The workpiece/preform element could be a cast part of intricate shape, an extruded bar that is either solid or hollow, or virtually any shape or constitution conventionally processed. In the event that pieces of bar stock material 50 are utilized, the holder 40 has an indexer 52 which shifts the bar stock 50 from a standby position at a feed end 54 to and from a working end 56 at which a free end portion 58 of the bar stock 50 is exposed for processing thereof.

The first holder 40 is translatable guidingly relative to the frame 38 along the X-axis. A central axis 60 of the bar stock 50 is parallel to the line of guided movement of the holder 40.

The second bar holder 42 receives the piece of bar stock 50 so that the central axis 60 of the piece of bar stock 50 in a second operative position on the second holder 42 is coincident with the axis 60 of the piece of bar stock 50 with the piece of bar stock 50 in the first operative position on the first holder 40 and coincident with operating axes defined by the first and second holders 40, 42.

The first and second holders 40, 42 each include a base 62, 64 of similar construction. Exemplary base 64 has a T-shaped receptacle 66 to accept a correspondingly configured guide element 68 on the frame 38 so as to permit guided movement of the base 64 along the frame 38 parallel to the X-axis. The base 62 has a similar construction and is mounted in similar fashion to the frame 38. With this arrangement, the first and second holders 40, 42 can be moved relative to each other to allow the bar stock 50 to be transferred directly between the first and second holders 40, 42.

The processing assembly 46 is carried by a slide assembly at 70 consisting of a first slide 72 connected to the frame 38 for guided movement relative to the frame 38 along the Z-axis, a second slide 74 mounted to the first slide 72 for guided movement relative to the first slide 72 along the X-axis, and a third slide 76 mounted to the second slide 74 for guided movement relative to the second slide 74 along the Y-axis. Each of the slides 72, 74, 76 can be mounted to the frame 38, and each other, through a connection similar to the aforementioned connection including the receptacle 66 and guide element 68. Other guide arrangements well known to those skilled in the art are contemplated. Virtually any arrangement that allows relative, guided, translatory movement between two elements could be used between the slides 72, 74, 76.

The processing assembly 46 is mounted to the slide 76 for pivoting movement about a vertical axis 78, transversely to the axis 60, preferably through 360°. A lesser degree of pivoting movement is also contemplated. The processing assembly 46 includes a rotary spindle 80 rotated by a drive 82 and having a receptacle 84 for a working tool 86 which can be selectively projected toward the first and second holders 40, 42 by such pivoting movement.

The slides 72, 74, 76 are relatively dimensioned and repositionable to allow the working tool 86 to process the free end surface 88 of the bar stock 50 in the first operative position on the first holder 40. By repositioning the slides 72, 74, 76 and pivoting the processing assembly 46 about the axis 78, the working tool 86 can process the exposed peripheral surface 90 on the piece of bar stock 50 in the first operative position on the first holder 40.

In a typical operation, the bar stock 50 is placed on the first holder 40 and indexed to expose the free end portion 58 thereof on which processing is to be carried out. When processing of the exposed free end portion 58 is completed, including any processing that is required on the surfaces 88, 90, the slide 76 is retracted from the FIG. 2 position, in the direction of the arrow 92 i.e. along the Y-axis, to allow the transfer of the bar stock 50 from the first holder 40 to the second holder 42. This can be accomplished by a direct transfer, as previously described, or optionally through a conventional type transfer mechanism 93.

The bar stock 50 in the first holder 40 can be nominally matched to the desired length of the completed workpiece. In that event, upon completion of the transfer, the end surface 94 of the bar stock 50, which is not exposed for processing with the bar stock 50 in the first operative position, becomes exposed for processing with the bar stock 50 in the second operative position from the second holder 42. Processing on the end surface 94 can be carried out by repositioning the slide assembly 70 and pivoting the processing assembly 46 around the axis 78 to place the working tool 86 in a position to engage the end surface 94.

In the event that multiple work pieces are to be formed from a single piece of the bar stock 50, the bar stock 50 has a length that is a multiple of the length of the completed workpieces, and the end surface 94 that is processed with the bar stock 50 in the second operative position on the second holder 42 is exposed by cutting the bar stock through the cutting assembly 48.

The cutting assembly 48 includes cutoff tool 96 carried on a slide assembly 98. The slide assembly 98 include a first slide 100 which is guided along the frame 38 parallel to the X-axis. A second slide 102, upon which the cutting assembly 48 is attached, is mounted to the first slide 100 for guided movement relative to the first slide 100 parallel to the Y-axis. With the bar stock 50 on the second holder 42, the cutting assembly 48 is repositioned through the slide assembly 98 to locate the cutoff tool 96 at the desired lengthwise cutoff position on the bar stock 50. The cutoff tool 96 then severs the bar stock 50, as by movement of the slide 102 along the Y-axis, to thereby expose the end surface 94 for processing.

An indexer 106 may be provided to rotationally position the bar stock 50 around the axis 60 on the first holder 40. A like indexer 108 may be provided on the second holder 42 to perform the same function. This allows the full peripheral surface 90 to be processed using the working tool 86.

The machine tool 36 may further include an auto tool changer 110 with a plurality of pods 112 each containing a working tool 86. The tool changer 110 includes an indexable turret/magazine 114 which places the desired pod 112 in an exchange position which allows a tool 86 to be exchanged between the pod 112 and the spindle 80 on the processing assembly 46.

Figure 5:
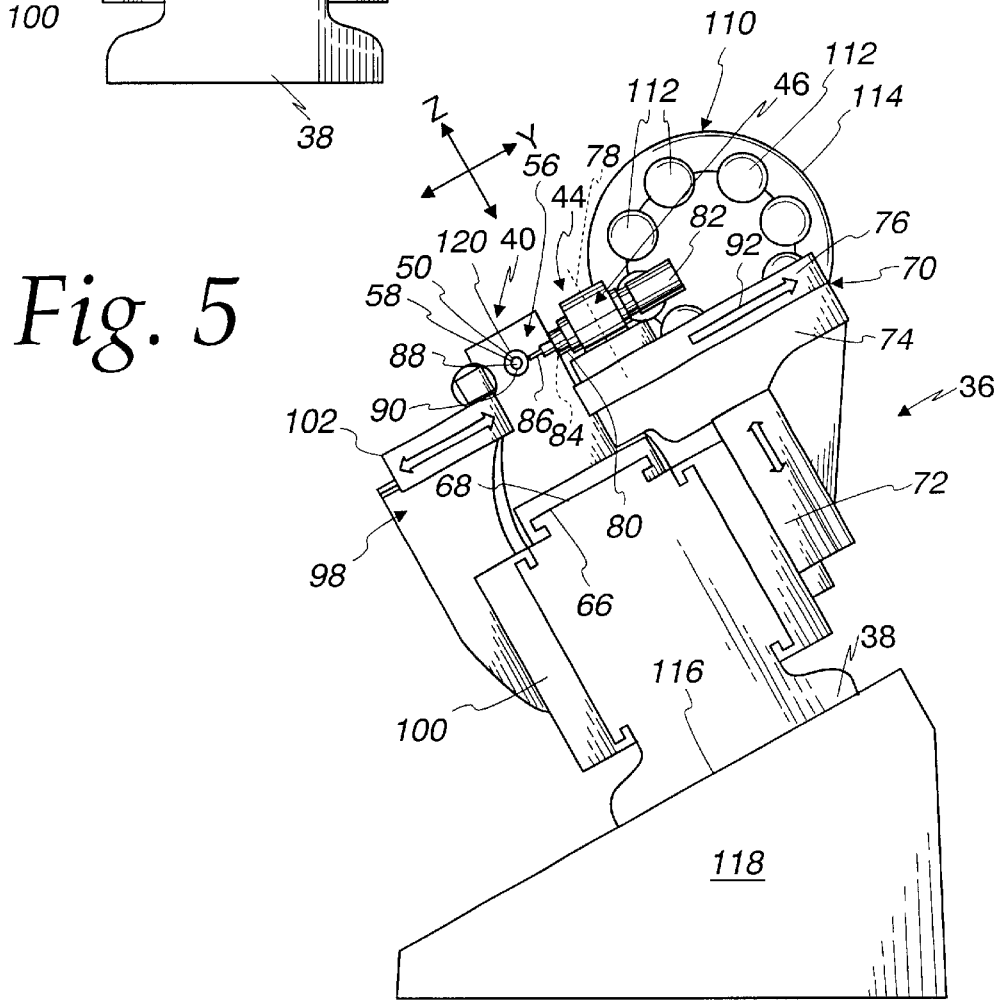
FIG. 5 is a side elevation view of the machine tool as in FIG. 4 mounted to a slant bed frame.
Figure 6:
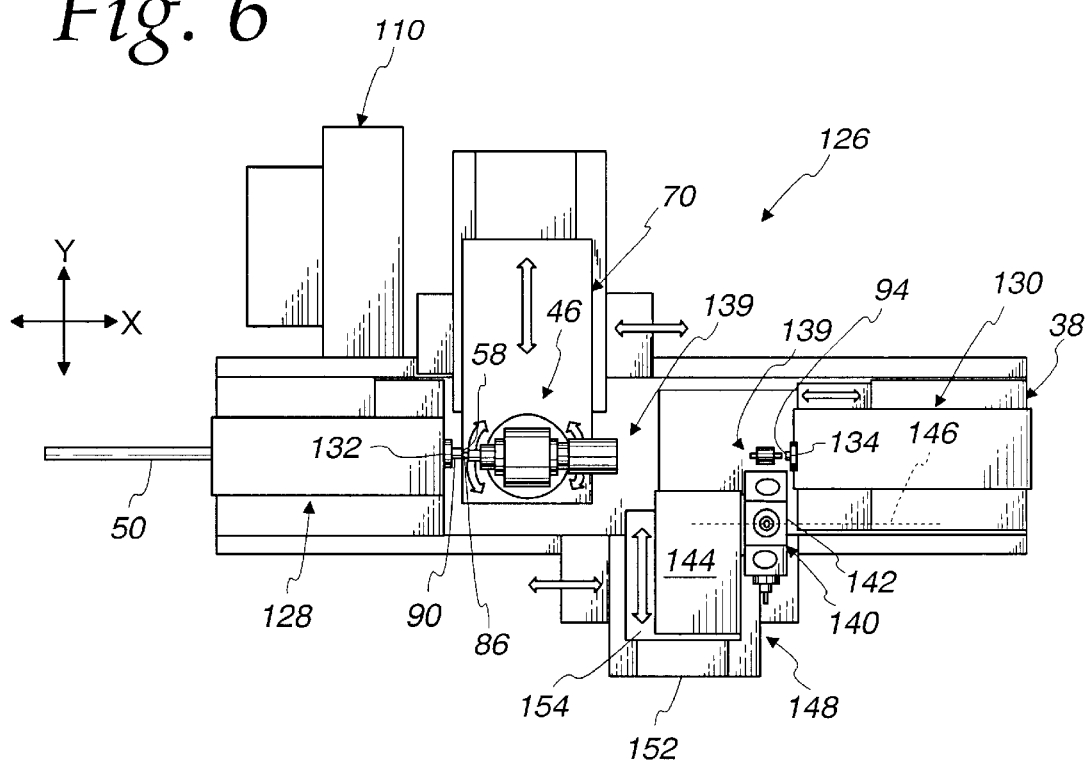
FIG. 6 is a plan view of a modified form of machine tool, according to the present invention, including first and second holders each capable of holding multiple pieces of stock material and first and second processing assemblies, which are operable independently to perform a processing operation on stock material held by the first and second holders.
Figure 7:
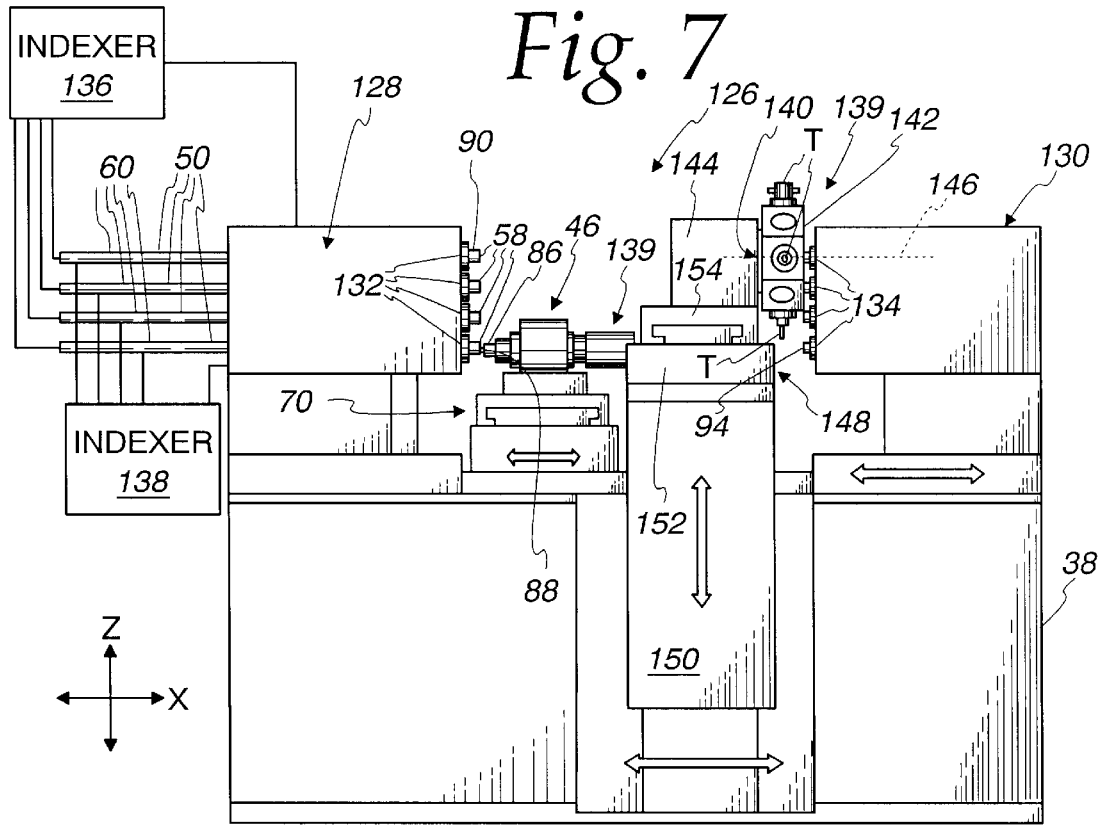
FIG. 7 is a front elevation view of the machine tool in FIG. 6 with the first processing assembly situated to perform a processing operation on the lowermost piece of stock on the first holder and the second processing assembly situated to perform a processing operation on the uppermost piece of stock on the second holder.
Figure 8:
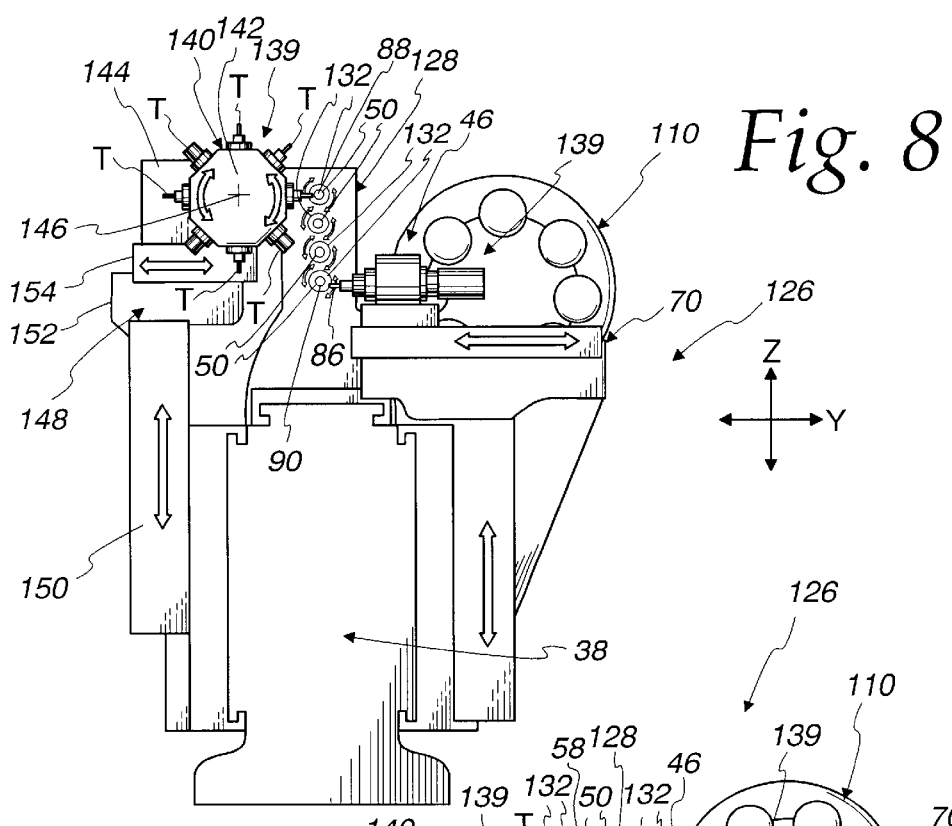
FIG. 8 is a side elevation view of the inventive machine tool configured as in FIG. 7 with the second holder removed for clarity.

In FIG. 5, the machine tool 36 is shown mounted on an inclined surface 116 on a slant bed frame 118 of the type disclosed in my U.S. Pat. No. 5,820,098.

To hold the bar stock 50, each of the holders 40, 42 may be provided with a chuck 120, 122, respectively. The chucks 120, 122 can be selectively opened and clamped to the bar stock, as required to hold the bar stock 50 for processing and release the bar stock 50 for transfer.

In operation, the bar stock 50 is loaded on the first holder 40 and indexed lengthwise to expose the free end portion 58 for processing. Processing is carried out through the processing assembly 46, at the conclusion of which the processing assembly 46 is retracted to allow the transfer of the bar stock 50 to the second holder 42. If the bar stock 50 that is transferred is significantly longer than the desired length of the completed workpiece, the cutoff tool 96 is used to sever the bar stock 50 to the desired length. The cutting assembly 48 is then retracted to allow the processing assembly 46 to complete processing upon the end surface 94, whereupon the bar stock 50 is released from the second holder 42 and delivered to an appropriate location, as for stocking or for further processing.

In FIGS. 6–9, a modified form of machine tool is shown at 126. The basic components on the machine tool 126 are the same as on the machine tool 36 and are numbered consistently. The machine tool 126 includes the frame 38 and the processing assembly 46 and the slide assembly 70 therefor. The automatic tool changer 110 allows interchange of working tools 86 on the processing assembly 46.

There are two primary differences between the machine tool 126 in FIGS. 6–9 and the machine tool 36 in FIGS. 2–5.

The machine tool 126 has first and second holders 128, 130 for the bar stock 50 corresponding to the holders 40, 42 on the machine tool 36. Whereas the holders 40, 42 accommodate a single piece of bar stock 50, the first and second holders 128, 130 each accommodate multiple pieces of bar stock 50. In this case, four pieces of bar stock 50 are accommodated by each holder 128, 130, with there being a like number of chucks 132, 134 on the holders 128, 130 to maintain the pieces of bar stock 50 in the operative position on the holders 128, 130 in vertically stacked relationship. On the first holder 128, an indexer 136, corresponding to the indexer 52 on the machine tool 36, is provided to controllably shift the bar stock 50 lengthwise along the holder 128. A separate indexer 138 incrementally pivots the pieces of bar stock 50 about their central axes 60. With this arrangement, the processing assembly 46 can be moved vertically, i.e. along the Z-axis, to process the free end portions 58 of the bar stock 50 exposed at the holder 128.

The second holder 130 may have a configuration similar to the first holder 128, including indexers (not shown) corresponding to, and functioning in the same manner as, the indexers 136, 138. The chucks 132, 134 are axially aligned to allow the direct transfer of pieces of bar stock bar 50 directly between the holders 128, 130. As in the prior embodiment, a transfer mechanism (not shown), corresponding to the transfer mechanism 92, could be used.

The second principal difference between the machine tool 126 and the machine tool 36 is that the processing system 139 on the machine tool 126 includes the first processing assembly 46 and a second processing assembly at 140. The processing assembly at 140 includes a tool turret 142 mounted on a support 144 for pivoting movement around an axis 146. The support 144 in turn is mounted on a slide assembly at 148. The slide assembly 148 includes a first slide 150 mounted to the frame 38 for guided movement relative to the frame along the Z-axis. A second slide 152 is mounted to the first slide 150 for guided movement relative to the first slide 150 along the X-axis. A third slide 154, to which the support 144 is attached, is movable guidingly relative to the second slide 152 along the Y-axis. With this arrangement, a desired working tool T carried on the turret 142 can be indexed to an active position to process the free end surfaces 88, 94 and the exposed peripheral surface 90 on the bar stock 50.

The slide assembly 148 can be constructed so that the tools T on the processing assembly 140 can be situated to perform a processing operation on the bar stock 50 in the operative position on either holder 128, 130. The slide assembly 70 can be constructed so that the working tool 96 on the processing assembly 46 likewise is capable of performing a processing operation on the bar stock 50 in the operative position on either holder 128, 130. Some of the processing options for the machine tool 126 are shown in FIGS. 10–15.

In FIGS. 11 and 12, the processing assemblies 46, 140 are situated to simultaneously perform an operation on the exposed peripheral surface 90 of the lowermost piece of bar stock 50 in the operative position on the first holder 128 and second holder 130, respectively.

It is also possible to configure the processing assemblies 46, 140 so that one of the free end surfaces 88, 94 is being processed on the bar stock 50 on one holder 128, 130 at the same time the exposed peripheral surface 90 on the bar stock 50 on the other holder 128, 130 is being processed.

In FIG. 10, a similar arrangement is shown, however, the processing assemblies 46, 140 are situated to perform a processing operation on the uppermost piece of bar stock 50 in the operative position on the first and second holder 128, 130.

In FIG. 14, the processing assemblies 46, 140 are situated to simultaneously perform a processing operation on a piece of bar stock 50 in an operative position on the first holder 128. The processing assembly 46 is situated so that the working tool 86 thereon performs a processing operation on the free end surface 88 of the piece of bar stock 50 simultaneously as the active tool T on the processing assembly 140 performs a processing operation on the exposed peripheral surface 90 on the bar stock 50.

In FIG. 15, the machining assemblies 46, 140 are situated so that the working tool 86 on the processing assembly 46 performs a processing operation on the end surface 94 of the bar stock 50 in the operative position on the second holder 130 simultaneously as the active tool T on the processing assembly 140 is performing a processing operation on the exposed peripheral surface 90 on the bar stock 50 with the bar stock 50 in the operative position on the second holder 130.

In FIG. 13, the processing assembly 46 is shown in position to exchange tools with the tool changer 110 while the second holder 130 has been advanced towards the first holder 128 to engage and pick up the bar stock 50 from the first holder 128. It should be noted that while the first holder 128 is actually stationary relative to the frame 38, it could be movable along the X-axis to facilitate bar stock transfer.

Figure 9:
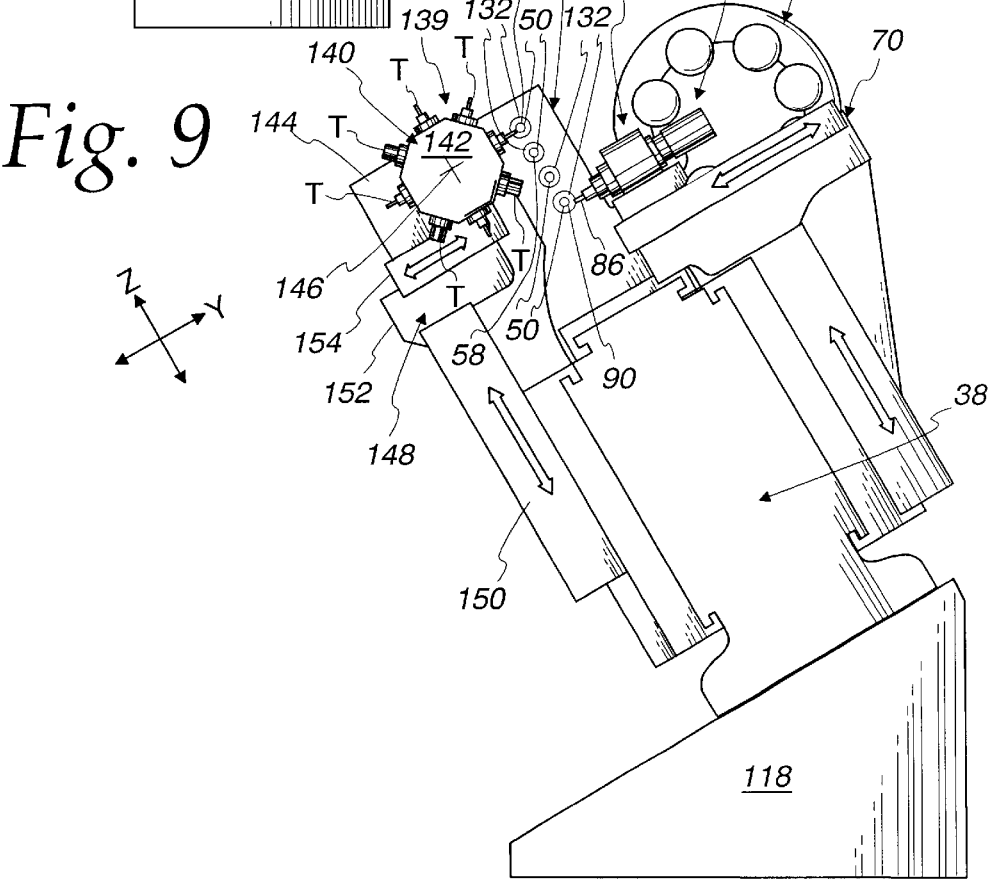
FIG. 9 is a side elevation view of the machine tool as in FIG. 8 mounted on a slant bed frame.
Figure 16:
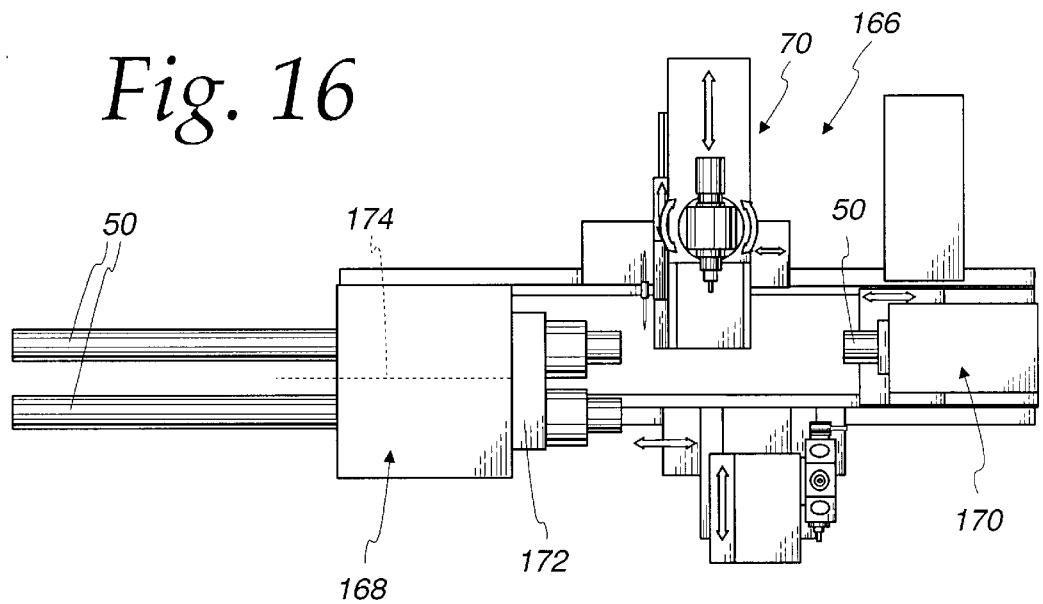
FIG. 16 is a plan view of a further modified form of machine tool, according to the present invention, including first and second holders, each with an indexable magazine for holding a plurality of pieces of stock material, and with first and second processing assemblies as in the machine tool in FIGS. 6–15.
Figure 17:
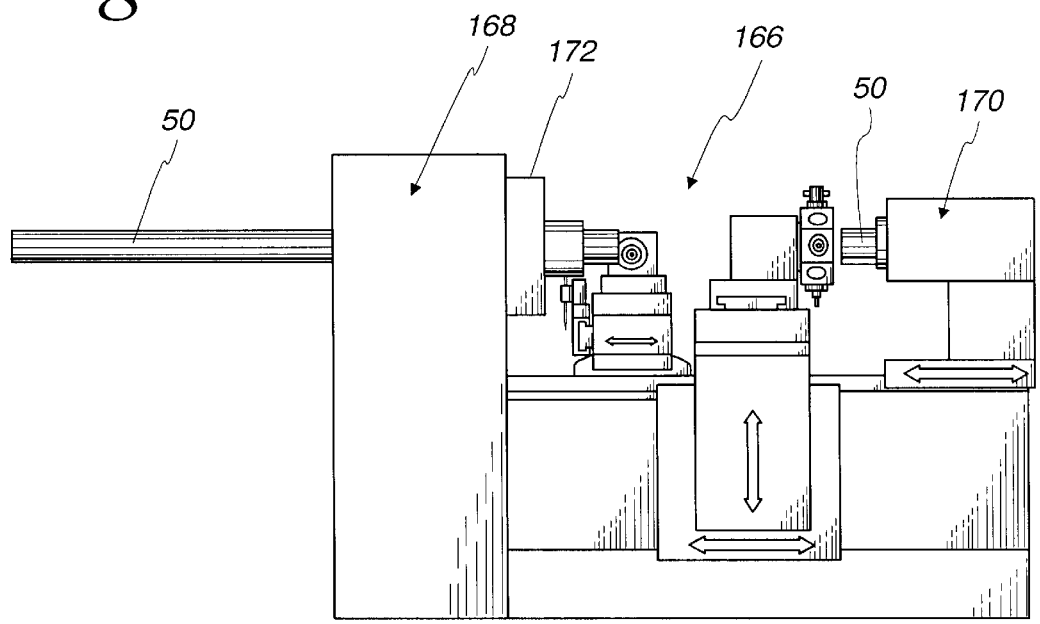
FIG. 17 is a front elevation view of the machine tool in FIG. 16.
Figure 18:
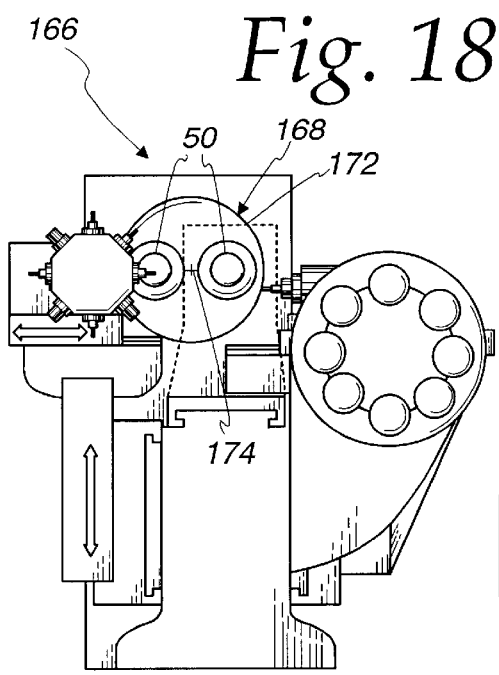
FIG. 18 is a side elevation view of the machine tool in FIGS. 16 and 17.
Figure 19:
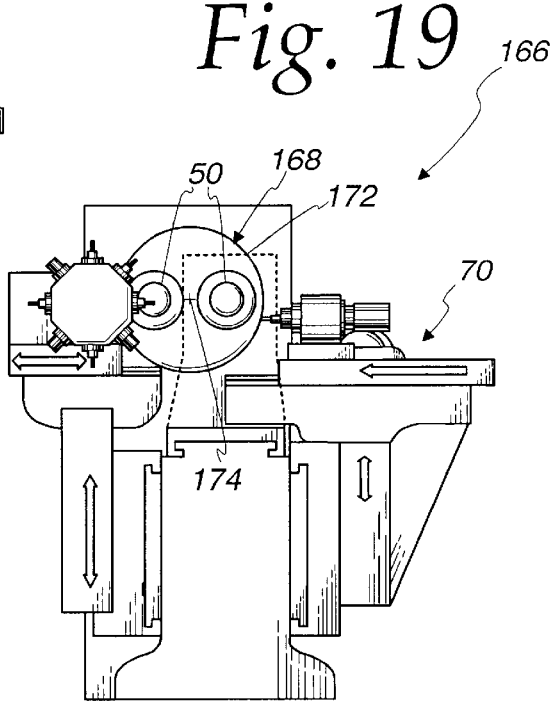
FIG. 19 is a view as in FIG. 18 with an automatic tool changer, for exchanging tools with at least one of the processing assemblies, removed for clarity.

As shown in FIG. 9, the machine tool 126 can be mounted on the slant bed frame 118.

With the machine tool 126, efficiency may be gained by having the ability to process several pieces of bar stock 50 on the first holder 128 before transfer to the second holder 130 is required. Further efficiency is potentially built in by simultaneously performing processing operations on the pieces of bar stock 50 on both the first and second holders 128, 130, or by simultaneously processing a single piece of bar stock 50 with both processing assemblies 46, 140.

In FIGS. 16–27, a further modified machine tool, according to the present invention, is shown at 166. The machine tool 166 has the same basic configuration as the machine tool 126, with the exception of the configuration of first and second holders, 168, 170, corresponding to the holders 128, 130 on the machine tool 126. Parts on the machine tool 166 that are the same as those on the machine tool 126 will be numbered the same.

The first holder 168 functions in the same manner as the first holder 128 in terms of holding bar stock 50 in an operative position so that processing operations can be performed thereon. The first holder 168 carries a plurality of pieces of bar stock 50 and has a magazine 172 thereon which is pivotable about a central axis 174 to thereby selectively, serially bring the pieces of bar stock 50 from an inactive position into an operative position at the same location for processing by the processing assembly 46 or the processing assembly 140. This obviates the need to move the machining assemblies 46, 140 in the same manner as required for the machine tool 126 with the multiple pieces of bar stock 50 in a fixed position on the machine tool 126.

The second holder 170 is shown to have the capacity to hold a single piece of bar stock 50. However, the second holder 170 can be constructed to simultaneously receive multiple pieces of bar stock 50 from the first holder 168 in a transfer operation.

The slide assemblies 70, 98 have the same construction as they do on the machine tool 126, while processing operations are performed on the pieces of bar stock 50 in the operative position on the first and second holders 168, 170 in the manner previously described.

Figure 25:
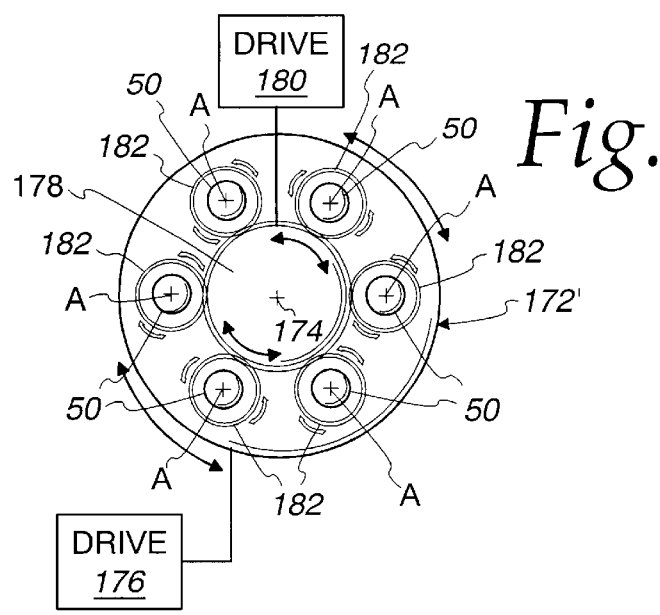
FIG. 25 is an enlarged, side elevation view of one form of indexable magazine for holding multiple pieces of stock material on one of the first and second holders on the machine tool in FIGS. 16–24.
Figure 26:
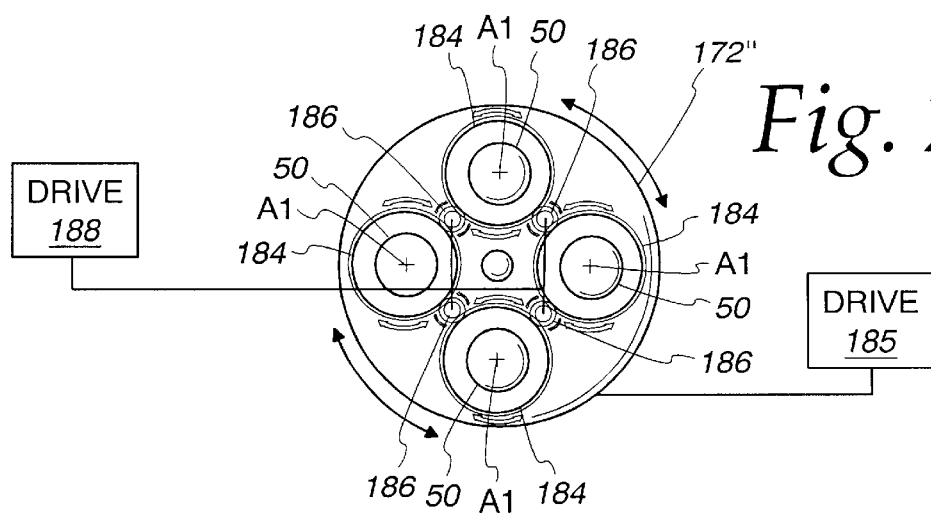
FIG. 26 is a view as in FIG. 25 of a modified form of indexable magazine.

Different constructions for the magazine 172 are shown at 172', 172" in FIGS. 25 and 26. In FIG. 25, the magazine 172' has a drive 176 for pivoting the entire magazine 172' around an axis 174. An indexing gear 178, pivoted by a separate drive 180 selectively in opposite directions around the axis 174, is geared to bar stock holders 182 around the periphery thereof. Pivoting of the gear 178 simultaneously pivots the holders 182 around their respective axes A to effect indexing so as to present the desired surface of the piece of bar stock 50 to the machining assemblies 46, 140. The use of six bar stock holders 182 is a design choice, as the basic concept can be practiced with virtually any number of bar stock holders 182, including a single bar stock holder 182.

In FIG. 26, the magazine 172" is shown with four bar stock holders 184. The magazine 172" is pivotable about the axis 174 through selective operation of a drive 185. The bar stock holders 184 are keyed to each other through gears 186, each in mesh with a pair of holders 184. By rotating the gears 186, the holders 184 are simultaneously pivoted around their axes A1 to effect indexing thereof. One or all of the gears 186 may be rotated by a drive 188.

Figure 27:
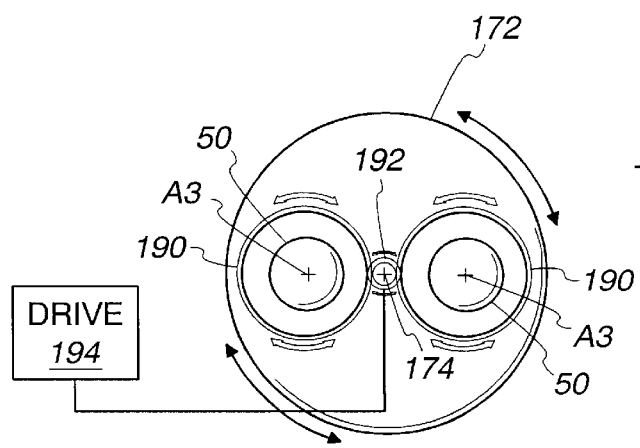
FIG. 27 is a view as in FIGS. 25 and 26 of a still further modified form of indexable magazine.

As shown in FIG. 27, the magazine 172, previously described, operates similarly to the magazine 172', with the exception of their being only two bar stock holders 190 corresponding to the bar stock holders 184. A gear 192 driven by a drive 194 selectively in opposite directions, causes simultaneous pivoting of the bar stock holders 190 about their axes A2.

It is possible with all of the magazines 172, 172', 172", and particularly with the magazine 172, to perform separate processing steps on more than one piece of bar stock 50 with one or both of the processing assemblies 46, 140 without indexing the magazine 172, 172', 172". That is, multiple pieces of bar stock 50 could both be in the operative position at the same time on one or both of the holders 168, 170.

Figure 20:
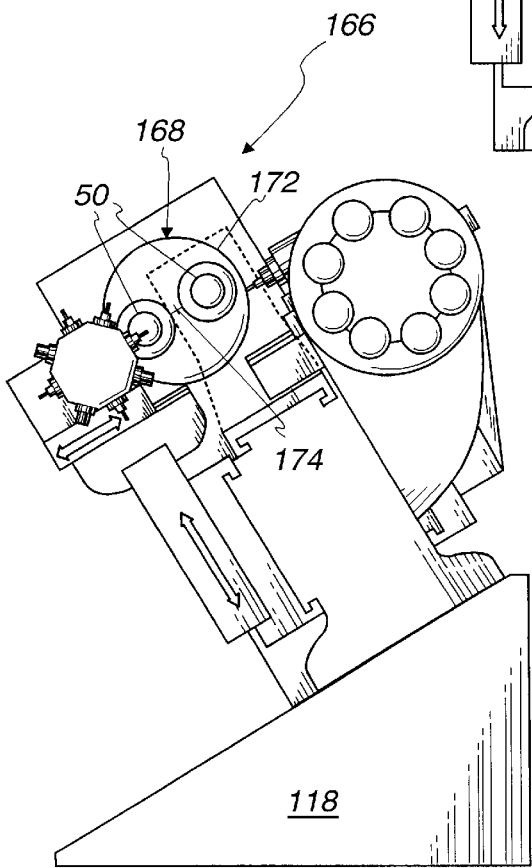
FIG. 20 is a side elevation view of the machine tool as in FIG. 18 and mounted on a slant bed frame.

In FIG. 20, the machining tool 166 is shown mounted upon the slant bed frame 118.

Figure 21:
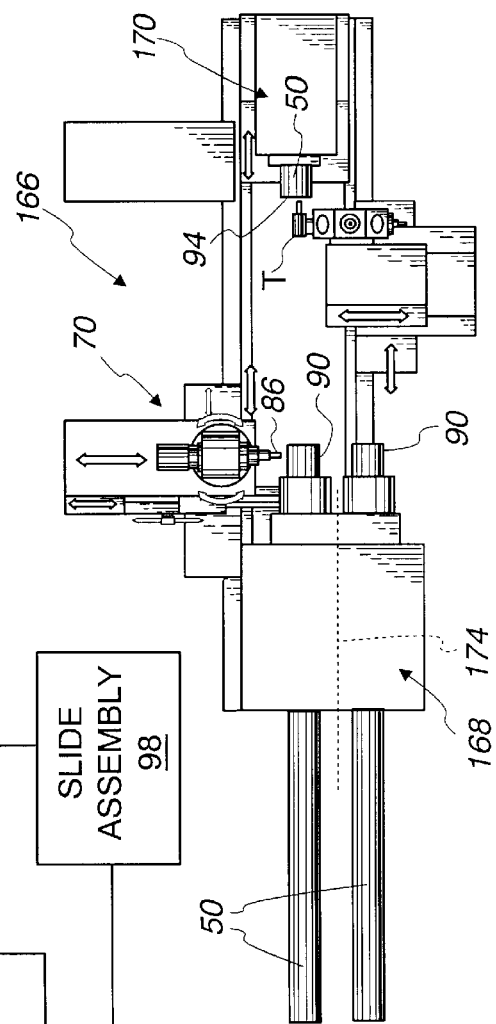
FIG. 21 is a plan view of the machine tool in FIGS. 16–20 showing a cutting tool positioned to sever stock material held between the first and second holders.

In FIG. 21, the machine tool 166 is configured to allow transfer of the bar stock 50 between the first and second holders 168, 170.

Figure 22:
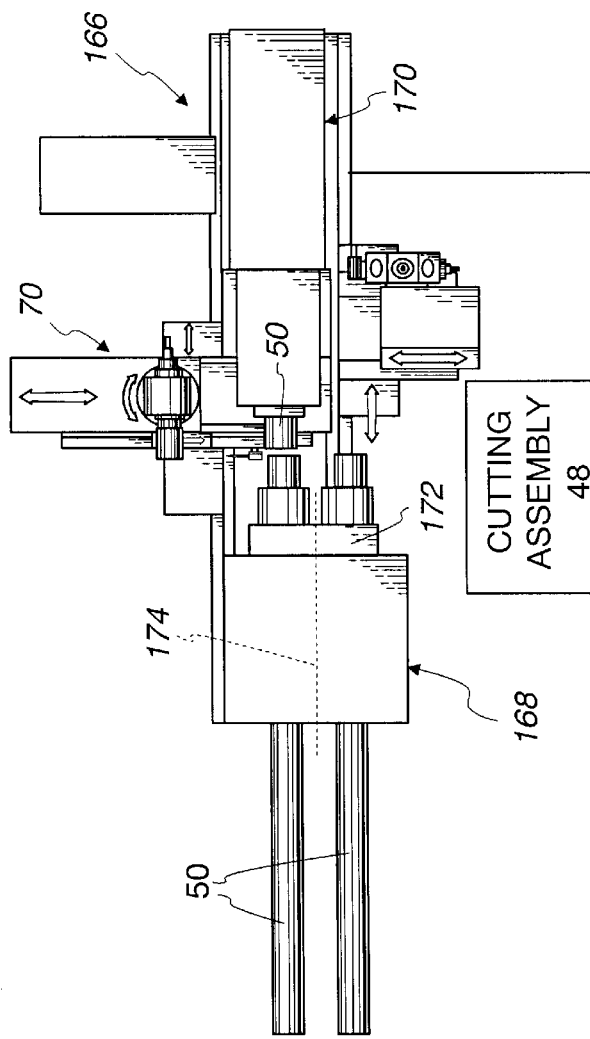
FIG. 22 is a plan view of the machine tool in FIGS. 16–21 with the first and second processing assemblies situated to perform processing operations on pieces of stock material on the first and second holders.

In FIG. 22, the machine tool 166 is configured with the working tool 86 on the processing assembly 46 performing a processing operation on the peripheral surface 90 of a piece of bar stock 50 in the operative position on the first holder 168. Simultaneously, an active tool T on the turret 152 on the processing assembly 140 is performing a processing operation on the end surface 94 of a piece of bar stock 50 in the operative position on the second holder 170.

Figure 23:
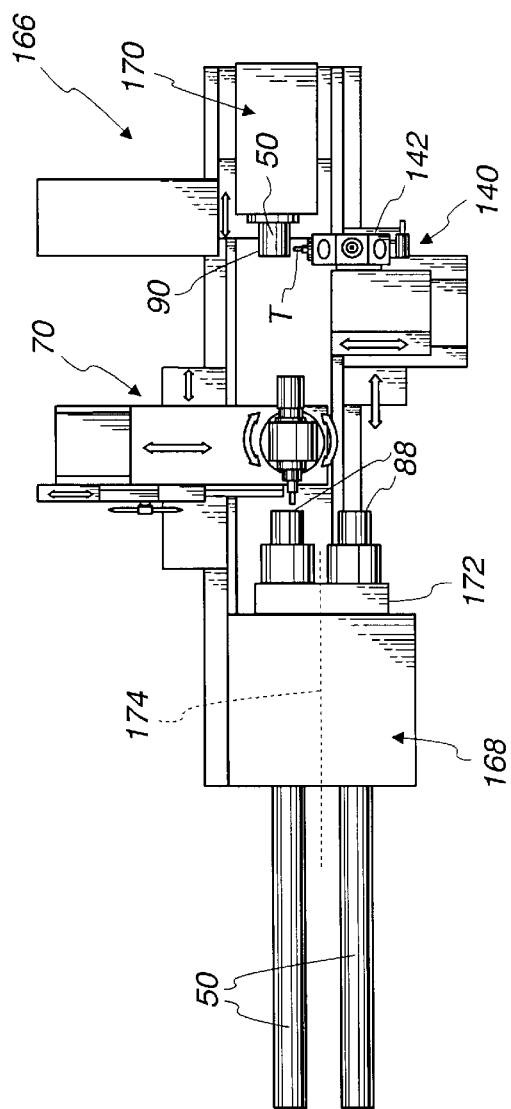
FIG. 23 is a view as in FIG. 22 with the processing assemblies reoriented to perform processing operations on different portions of the stock material on the first and second holders.

In FIG. 23, the working tool 86 on the processing assembly 46 is shown performing a processing operation on the free end surface 88 of bar stock 50 in the operative position on the first holder 168, while an active tool T on the turret 142 on the processing assembly 140 is performing a processing operation on the exposed peripheral surface 90 on the bar stock 50 in an operative position on the second holder 170.

Figure 24:
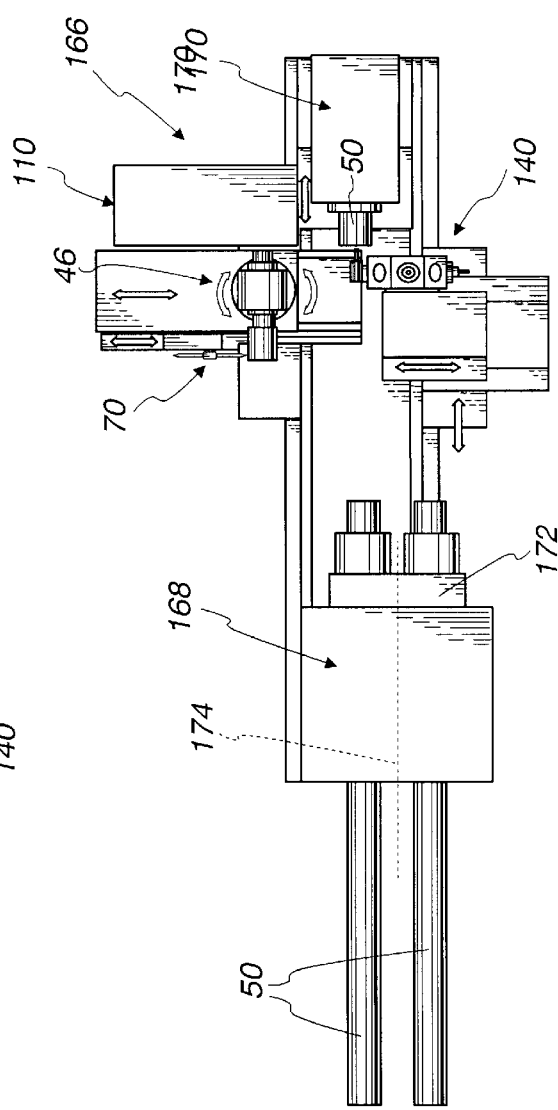
FIG. 24 is a plan view of the machine tool in FIGS. 16–23 and with one of the processing assemblies situated to effect tool exchange through an automatic tool changer.

In FIG. 24, the processing assembly 140 is positioned to perform a processing operation as in FIG. 22, with the processing assembly 46 retracted and situated to exchange tools with the tool changer 110.

The foregoing disclosure of specific embodiments is intended to be illustrative of the broad concepts comprehended by the invention.

What is claimed is:

1. A machine tool comprising:

a first holder for maintaining a first preform element in a first operative position wherein a first portion of the first preform element is exposed so that a processing operation can be performed on the first portion of the first preform element;

a second holder for maintaining the first preform element in a second operative position wherein a second portion of the first preform element that is not exposed for processing with the first preform element in the first operative position is exposed for processing; and a processing system comprising at least one processing assembly for performing a processing operation on the first portion of the first preform element in the first operative position and the second portion of the first preform element in the second operative position, wherein the at least one processing assembly comprises a first processing assembly that is repositionable relative to the first and second holders to allow the first processing assembly to perform a processing operation on the first preform element in the first operative position and a processing operation on the first preform element in the second operative position, wherein the first processing assembly has a first tool that is rotatable around a first axis for performing a processing operation and at least part of the first processing assembly carrying the first tool is pivotable around a second axis that is transverse to the first axis to permit selective processing of the first preform element in the first and second operative positions for the first preform elements, wherein the first holder has an operating axis and the second axis is transverse to the operating axis, wherein the first holder has first and second ends spaced axially relative to the operating axis and a workpiece can be fed axially relative to the operating axis up to and through the first end of the first holder and to and through the second end of the first holder so as to be exposed for processing by the processing system.

2. The machine tool according to claim 1 wherein at least part of at least one of the first and second holders is movable guidingly relative to the other of the first and second holders to allow the first preform element to be transferred directly from the first holder to the second holder.

3. The machine tool according to claim 1 in combination with the first preform element.

4. The machine tool according to claim 3 wherein the first preform element comprises an elongate piece of bar stock.

5. The machine tool according to claim 1 wherein the processing system comprises a second processing assembly that is operable independently of the first processing assembly to perform a processing operation on the first preform element in the second operative position and movable relative to the first processing assembly along the operating axis.

6. The machine tool according to claim 5 wherein the second processing assembly comprises a turret with a plurality of tools that are selectively operable to perform a processing operation on the first preform element in the second operative position.

7. The machine tool according to claim 6 wherein the turret is translatable guidingly along two orthogonal axes.

8. The machine tool according to claim 1 wherein the first holder is capable of holding a second preform element at the same time the first preform element is on the first holder.

9. The machine tool according to claim 1 wherein the second holder is capable of holding a second preform element at the same time the first preform element is on the second holder.

10. The machine tool according to claim 1 further comprising a transfer mechanism independent of the first and second holders for transferring a preform element held by one of the first and second holders to the other of the first and second holders.

11. The machine tool according to claim 1 further comprising an indexer for selectively rotationally positioning a preform element around the operating axis.

12. A machine tool comprising:

a first holder for maintaining a first preform element in a first operative position wherein a first portion of the first preform element is exposed so that a processing operation can be performed on the first portion of the first preform element;

a second holder for maintaining the first preform element in a second operative position wherein a second portion of the first preform element that is not exposed for processing with the first preform element in the first operative position is exposed for processing;

a processing system comprising at least one processing assembly for performing a processing operation on the first portion of the first preform element in the first operative position and the second portion of the first preform element in the second operative position, wherein the at least one processing assembly comprises a first processing assembly that is repositionable relative to the first and second holders to allow the first processing assembly to perform a processing operation on the first preform element in the first operative position and a processing operation on the first preform element in the second operative position, wherein the first processing assembly has a first tool that is rotatable around a first axis for performing a processing operation and at least part of the first processing assembly carrying the first tool is pivotable around a second axis that is transverse to the first axis to permit selective processing of the first preform element in the first and second operative positions for the first preform elements, wherein the first holder has an operating axis and the second axis is transverse to the operating axis, wherein the processing system comprises a second processing assembly that is operable independently of the first processing assembly to perform a processing operation on the first preform element in the second operative position and movable relative to the first processing assembly along the operating axis; and a cutting assembly movable relative to the first and second processing assemblies along the operating axis for severing the first preform element on at least one of the first and second holders and thereby exposing the second portion of the first preform element.

13. A machine tool comprising:

a first holder for maintaining a first preform element in a first operative position wherein a first portion of the first preform element is exposed so that a machining operation can be performed on the first portion of the first preform element;

a second holder for maintaining the first preform element in a second operative position wherein a second portion of the first preform element that is not exposed for processing with the first preform element in the first operative position is exposed for processing; and a processing system comprising at least one processing assembly for performing a processing operation on the first portion of the first preform element in the first operative position and the second portion of the first preform element in the second operative position, wherein the at least one processing assembly comprises a first processing assembly that is repositionable relative to the first and second holders to allow the first processing assembly to perform a processing operation on the first preform element in the first operative position and a processing operation on the first preform element in the second operative positions, wherein the first processing assembly has a first tool that is rotatable around a first axis for performing a processing operation and at least part of the first processing assembly carrying the first tool is pivotable around a second axis that is transverse to the first axis to permit selective processing of the first preform element in the first and second operation positions for the first preform element, wherein the at least part of the first processing assembly is movable guidingly along three orthogonal axes, wherein the first holder has first and second ends spaced axially relative to the operating axis and a workpiece can be fed axially relative to the operating axis up to and through the first end of the first holder and to and through the second end of the first holder so as to be exposed for processing by the processing system.

14. A machine tool comprising:

a first holder for maintaining a first preform element in a first operative position wherein a first portion of the first preform element is exposed so that a machining operation can be performed on the first portion of the first preform element;

a second holder for maintaining the first preform element in a second operative position wherein a second portion of the first preform element that is not exposed for processing with the first preform element in the first operative position is exposed for processing; and a processing system comprising a least one processing assembly for performing a processing operation on the first portion of the first preform element in the first operative position and the second portion of the first preform element in the second operative position, wherein the at least one processing assembly comprises a first processing assembly that is repositionable relive to the first and second holders to allow the first processing assembly to perform a processing operation on the first preform element in the first operative position and a processing operation on the first preform element in the second operative position, wherein the first processing assembly comprises a tool receptacle and the machine tool further comprises an automatic tool changer for selectively placing different tools in the tool receptacle, wherein the first holder has first and second ends spaced axially relative to the operating axis and a workpiece can be fed axially relative to the operating axis up to and through the first end of the first holder and to and through the second end of the first holder so as to be exposed for processing by the processing system.

15. A machine tool comprising:

a first holder for simultaneously maintaining a first preform element in a first operative position wherein a first portion of the first preform element is exposed so that a processing operation can be performed on the first portion of the first preform element and a second preform element in a second operative position wherein a first portion of the second preform element is exposed so that a processing operation can be performed on the first portion of the second preform element;

a second holder for maintaining the first preform element in a third operative position wherein a second portion of the first preform element that is not exposed for processing with the first preform element in the first operative position is exposed for processing; and a processing system comprising at least one processing assembly for performing a processing operation on the first portion of the first preform element in the first operative position, the first portion of the second preform element in the second operative position, and the second portion of the first preform element in the third operative position, wherein the first holder has first and second ends spaced axially relative to the operating axis and a workpiece can be fed axially relative to the operating axis up to and through the first end of the first holder and to and through the second end of the first holder so as to be exposed for processing by the processing system.

16. A machine tool comprising:

a first holder having a portion for holding first and second preforms that is movable to selectively place the first preform element in a first operative position at a first location wherein a first portion of the first preform element is exposed so that a machining operation can be performed on the first portion of the first preform element and the second preform in an operative position at the first location wherein a first portion of the second preform element is exposed so that a machining operation can be performed on the first portion of the second preform element;

a second holder for maintaining the first preform element in a second operative position wherein a second portion of the first preform element that is not exposed for processing with the first preform element in the first operative position is exposed for processing; and a processing system comprising at least one processing assembly for performing a processing operation on the first portion of the first preform element in the first operative position, wherein the first holder has first and second ends spaced axially relative to the operating axis and a workpiece can be fed axially relative to the operating axis up to and through the first end of the first holder and to and through the second end of the first holder so as to be exposed for processing by the processing system.

17. A machining tool comprising:

a first holder for maintaining a first preform element in a first operative position wherein a first portion of the first preform element is exposed so that a machining operation can be performed on the first portion of the first preform element;

a second holder for maintaining the first preform element in a second operative position wherein a second portion of the first preform element that is not exposed for processing with the first preform element in the first operative position is exposed for processing; and a processing system comprising at least one processing assembly for performing a processing operation on the first portion of the first preform element in the first operative position and the second portion of the first preform element in the second operative position, wherein the at least one processing assembly comprises a first processing assembly that is repositionable relative to the first and second holders along three orthogonal axes, wherein the first holder has first and second ends spaced axially relative to the operating axis and a workpiece can be fed axially relative to the operating axis up to and through the first end of the first holder and to and through the second end of the first holder so as to be exposed for processing by the processing system.

18. The machine tool according to claim 17 wherein the first holder is capable of maintaining a second preform element in an operative position simultaneously as the first preform is maintained in the first operative position so that first and second preforms can be selectively processed by the processing system.

* * * * *